United States Patent [19]

Amagami et al.

[11] 3,821,509

[45] June 28, 1974

[54] INDUCTION HEATING EQUIPMENT HAVING PROTECTIVE ARRANGEMENTS

[75] Inventors: Keizo Amagami; Hazime Mori; Takao Kobayashi; Mitsuyuki Kiuchi; Yoshio Ogino, all of Osaka, Japan

[73] Assignee: Matsushita Electric Industrial Co., Osaka, Japan

[22] Filed: July 24, 1972

[21] Appl. No.: 274,179

[30] Foreign Application Priority Data
Apr. 10, 1972 Japan.............................. 47-36371
Apr. 10, 1972 Japan.............................. 47-36372
Apr. 10, 1972 Japan.............................. 47-36373
Apr. 10, 1972 Japan.............................. 47-36364
Apr. 10, 1972 Japan.............................. 47-36366

[52] U.S. Cl.............. 219/10.77, 219/10.49, 321/11, 321/24
[51] Int. Cl. ............................................. H05b 5/04
[58] Field of Search........... 219/10.49, 10.75, 10.77, 219/10.79; 321/11, 45 C, 24

[56] References Cited
UNITED STATES PATENTS
2,429,819 10/1947 Jordan............................ 219/10.77
2,626,378 1/1953 Levy................................... 321/24
3,046,466 7/1962 Tyrrell et al........................ 321/24
3,129,366 4/1964 Fry............................ 219/10.77 UX
3,161,834 12/1964 Noyes.............................. 321/11 X
3,227,940 1/1966 Gilbert et al........................ 321/11
3,332,036 7/1967 Kappenhagen et al. ......... 219/10.75
3,514,688 5/1970 Martin............................. 321/11 X
3,637,970 1/1972 Cunningham................... 219/10.75
3,710,062 1/1973 Peters.............................. 219/10.49

Primary Examiner—Bruce A. Reynolds

[57] ABSTRACT

Herein disclosed is an induction heating equipment having a self-exciting chopper type inverter unit having a combination of a silicon controlled or otherwise gate-controlled rectifier and a diode connected in parallel to a d.c. power source for generating heat in a material to be heated through creation of eddy current and hysteresis losses in the material by building up a changing magnetic field induced by a current having suitable frequencies. Protective means are provided in such equipment so that the inverter unit, especially the silicon controlled rectifier of the unit, is protected from incurring a damage when the inverter unit is to be actuated or in the event an unusually increased voltage is produced in the inverter unit during operation. A typical application of the equipment is a cooking equipment using the induction heating process.

7 Claims, 14 Drawing Figures

SHORT-CIRCUIT

INDUCTION HEATING EQUIPMENT HAVING PROTECTIVE ARRANGEMENTS

The present invention relates to induction heating equipment and, more particularly, to inverter devices of the induction heating equipment.

In the induction heating equipment, an electrically conductive material is subjected to a varying magnetic field which is established by an electric current having suitable frequencies and flowing in proximity to such material. The varying magnetic field in the material produces an eddy current loss and a hysteresis loss therein so that the temperature of the material increases. While the induction heating equipment of this character may find a variety of practical applications for industrial purposes and in kitchen utensils, the equipment will be herein described as being typically the kitchen ovens or ranges for cooking food by an induction heating process.

The usual inverter devices of the induction heating equipment is the self-exciting chopper type inverter that uses a combination of a diode and a silicon controlled rectifier which is typically a thyristor. The silicon controlled rectifier and diode are connected to positive and negative bus lines leading from a source of d.c. power such as a full-wave rectifier unit. These two elements are connected to the bus lines in opposite directions and in parallel to a resonant circuit comprising a capacitor and a resonance coil. The silicon controlled rectifier has a gate terminal which is connected to a gate pulse generator adapted to trigger the silicon controlled rectifier in a timed fashion. When the chopper type inverter of this general construction is to be actuated, it sometimes happens that the silicon controlled rectifier fails to be triggered at a proper timing if the voltage between the positive and negative bus lines is at a relatively low level, whereby the inverter is unable to be actuated although the bus lines are in an energized condition. This takes place especially during a condition in which the voltage between the bus lines is being consumed in charging a smoothing capacitor interconnecting the bus lines. Repeated occurance of the failures of the inverter being actuated results in a serious damage of the silicon controlled rectifier and possibly the associated diode. An important object of the present invention is to provide an induction heating equipment having an improved inverter circuit which is capable of being actuated in a stabilized condition so that the silicon controlled rectifier forming essential part of the inverter circuit is protected from being damaged for the reasons above discussed. This object will be basically achieved in such a manner that not a power but a signal with a relatively small magnitude is fed back to the gate circuit of the silicon controlled rectifier so that the oscillation frequency of the inverter circuit can be maintained substantially constant when the inverter circuit is being actuated.

A drawback has also been encountered in the chopper type inverter of the prior art construction in that it is difficult to have the inverter actuated at an instant when the voltage supplied thereto is at a zero level. In some cases, the inverter is actuated even at tens of volts depending upon the performance characteristics of the parts and elements making up the inverter circuit, thus causing various troubles and failures therein. It is, therefore, another important object of the present invention to provide an induction heating equipment having an improved inverter circuit which can be assuredly actuated in a zero-volt condition at whichsoever instant an actuating switch of the heating equipment may be closed. This specific object will be achieved basically by generating pulses of a digital character for driving the silicon controlled rectifier when the supplied voltage reaches a zero level.

It is, furthermore, experienced in using the induction heating equipment having the chopper type inverter that the voltage across the silicon controlled rectifier and associated diode rises to an unusually high level when the inverter is actuated under an unloaded condition, viz., in the absence of a material to be heated. This causes the silicon controlled rectifier and diode to be damaged. The present invention thus has still another important object of providing an induction heating equipment having an improved inverter which can be actuated stably under loaded and unloaded conditions of the equipment, viz., without respect to the presence and absence of the material to be heated. Yet, it is another important object of the present invention to provide an induction heating equipment having an improved inverter circuit in which the silicon controlled rectifier and diode forming essential part of the circuit are free from damage that would otherwise result from an unusual increase in the voltage when the inverter circuit is being actuated without a load incorporated therein. These objects of the invention will be accomplished through provision of a resistor connected in series with an induction heating coil of the inverter circuit for consuming an excess of the voltage impressed thereon. This resistor is short-circuited once the inverter circuit has been actuated in a stable condition. At the very instant at which the resistor is thus shunted, unusual oscillations will be invited in the inverter circuit due to sudden change in the various operating parameters of the circuit if the resistor happens to be short-circuited when the supplied voltage is at or in the neighbourhood of its peak values. When this occurs, an unusually high voltage will be set up across the silicon controlled rectifier and associated diode of the inverter circuit. The silicon controlled rectifier and diode are thus invariably subject to damage even though the inverter circuit per se has been successfully actuated in a stabilized condition. To prevent such unusual increase in the voltage across the silicon controlled rectifier and diode, an arrangement may preferably be made in accordance with the present invention so that the resistor connected to the induction heating coil is short-circuited when, and only when, the supplied voltage is at or in the close vicinity of a zero level whereby the voltage across the silicon controlled rectifier and diode can be prevented from being stepped up to an unusually high level even though the unusual oscillations are being invited in the inverter circuit. Provision of such an arrangement will prove advantageous not only for the protection of the silicon controlled rectifier and diode of the inverter circuit from incurring serious damages but for avoiding unwanted power consumption during operation of the induction heating equipment.

Where the inverter circuit of the prior art construction is used particularly in the cooking equipment of the induction heating type as previously noted, the inverter circuit is subject to considerable variation in the amount of load applied thereto because various kinds of material must be treated in the equipment and, in some cases, the equipment per se will happen to be actuated in an unloaded condition. This again will cause the inverter circuit to fail to be actuated properly and stably and, thus, serious damages of the silicon controlled rectifier and diode of the circuit will invariably result. To eliminate this drawback, a method has been proposed and put into practice in which the resonance frequency of the inverter circuit is varied when the circuit is being actuated. Incorporation of an increased number of semiconductor elements in the inverter circuit is inevitable to carry out this prior art method and, accordingly, the reliability of the circuit as a whole decreases and the production cost of the circuit increases. It is, thus, still another important object of the present invention to provide an induction heating equipment having an improved inverter circuit which is capable of being actuated in a satisfactorily stabilized condition substantially irrespective of the variation in the amount of load to which the inverter circuit is to be subjected. This specific object will be accomplished basically in such a manner that the inductance of the inverter circuit is augmented when the circuit is being actuated. This will prove advantageous not only for enabling the inverter circuit to be actuated at all times in a stabilized condition but for protecting the silicon controlled rectifier and diode of the circuit from incurring serious damages and for avoiding arc discharge from the actuating switch of the inverter circuit, as will be more clearly understood as the description of the present invention proceeds.

The operating parameters of the inverter circuit vary markedly depending upon the magnetic permeabilities and specific electric resistances of the materials to be treated by the induction heating equipment. This is reflected by variation in the resonance frequency of the inverter circuit using the silicon controlled rectifier such as the thyristor and, as a consequence, the turn-off time of the silicon controlled rectifier is shortened. If, in this instance, such turn-off time is shortened to a crucial extent, then there will be a danger that the current can not flow through the silicon controlled rectifier in the opposite directions, with the result that the silicon controlled rectifier is damaged. In case the resonance frequency of the inverter circuit does not vary to such a critical extent, there will still be a danger that an overcurrent in the forward direction flows through the silicon controlled rectifier so that an unusual increase in the junction temperature results, giving rise to another cause of the damage of the silicon controlled rectifier. It is, therefore, further and another important object of the present invention to provide an induction heating equipment having an improved inverter circuit in which the silicon controlled rectifier forming part of the inverter circuit is protected from damage through detection of the turn-off time of the rectifier and the current flowing through the element in the forward direction. It is further and another important object of the present invention to provide an induction heating equipment having an improved inverter circuit which is protected from being damaged when a material having a magnetic permeability and a specific resistance which are objectionable from the given performance characteristics of the inverter circuit.

Yet, it is another important object of the present invention to provide an improved induction heating equipment having an improved inverter circuit in which the full-wave rectifier unit and the filter capacitor are protected from damage that would otherwise result from a flow of surge current therethrough.

It is still another important object of the present invention to provide an improved induction heating equipment having an improved inverter circuit in which loss of power in the circuit as a whole is reduced to a minimum and in which the safety of each of the elements and accordingly the safety of the entire circuit are ensured.

It is still another important object of the present invention to provide an improved induction heating equipment having an improved inverter circuit in which a switching element such as a silicon controlled rectifier is used as a power switch and in which a control switch for triggering the switching element is positioned in proximity to the heating coil of the inverter circuit whereby not only the reliability of the inverter circuit is enhanced but also ease of manipulating the heating equipment is achieved as compared with the prior art induction heating equipment.

In the foregoing description and in the description and claims to follow, a germanium or otherwise controlled rectifier may be used in lieu of the silicon controlled rectifier which acts as an essential operating element of the inverter circuit in the induction heating equipment according to the present invention. It should therefore be borne in mind that the use of the silicon controlled rectifier in the inverter circuit herein disclosed is merely by way of example and, as such, the silicon controlled rectifier should be understood to be one of the various "gate-controlled" rectifiers of the known characters.

The various objects of the present invention as above described are accomplished primarily in an induction heating equipment having an inverter circuit which comprises, in combination, rectifying means for supplying a d.c. power, a gate-controlled rectifier and a filter inductor which are serially connected to the rectifying means, a triggering circuit connected to a gate terminal of the gate-controlled rectifier, a combination of serially connected commutating capacitor and commutating inductor which are connected in parallel to the gate-controlled rectifier, first protective means for protecting the gate-controlled rectifier when the inverter circuit is being actuated, second protective means for protecting the gate-controlled rectifier when the inverter circuit is subjected to an unusual load, and output means for delivering an output from the inverter circuit. The first protective means of the inverter circuit may comprise switching means connected to the triggering circuit for the gate-controlled rectifier and switch control means for producing a signal with a relatively small magnitude related to oscillation frequency of the inverter circuit and supplying the signal to the switching element for maintaining the oscillation frequency substantially constant. The protective means having this construction is useful for assuring stabilized actuation of the inverter circuit even in a condition in which the voltage across the gate-controlled rectifier is at a relatively low level. For the purpose of enabling the inverter circuit to be actuated when the supplied voltage is at a zero level, the first protective means may be made up of a pulse generating circuit producing a pulse train which is synchronized with the frequency of the supplied voltage, a quick discharge circuit which is actuated when the pulse width of the pulses thus produced from the pulse generating circuits exceeds a predetermined value, and a switching circuit which is driven by the pulses produced from the pulse generating circuit. Or otherwise, the first protective means of the described inverter circuit may comprise a variable induction element connected serially to the output means of the inverter for increasing the inductance of the variable induction element when the inverter circuit is being actuated. The protective means of this character is advantageous for preventing the damage or failure of the gate-controlled rectifier as would otherwise be caused when the inverter circuit is subject to marked variation in the load. For the purpose that the development of an unusually increased voltage under an unloaded condition of the inverter circuit, the first protective means may comprise a resistor connected in series with the output means of the inverter circuit, a detecting circuit which is operable to be actuated to produce an output signal when the supplied voltage reaches zero volt, and means for short-circuiting the above mentioned resistor in response to the output signal from the detecting circuit whereby the resistor is shunted when the supplied voltage reaches a zero level.

The first protective means in still another form may comprise a relay contact and a capacitor connected in series with the rectifying means, a main switch and a resistor connected in series with each other and in parallel to the relay contact, and a relay coil connected to the resistor in a manner as to remain inoperative when the resistor is conducting and to be actuated when the resistor is short-circuited whereby generating of a rush current through a filter capacitor forming part of the inverter circuit is prevented during operation.

The second protective means which is intended specifically to protect the gate-controlled rectifier from incurring a damage in the event an unusual load is applied to the inverter circuit may comprise a first detecting circuit for detecting a resonance frequency governed by operational parameters of the inverter circuit and a second detecting circuit for detecting a current fed to the inverter circuit, wherein the oscillating operation of the inverter circuit is forcibly terminated when at loast either of the resonance frequency and the current detected by the first and second detecting circuits, respectively, exceeds a predetermined value.

The inverter circuit of the induction heating equipment according to the present invention may comprise, in another preferred form, a high-frequency oscillation unit having an inverter type high-frequency oscillation circuit connected to a source of power through a gate-controlled rectifier, a control unit having an induction heating coil connected to the high-frequency oscillation circuit, and a heat-sensitive switch and a control switch which are positioned in proximity to the control unit for preventing the induction heating coil from being overheated, the gate-controlled rectifier having a gate terminal connected to the source of power through the heat-sensitive and control switches. The arrangement of the inverter circuit of this nature will prove useful for the purpose of facilitating the manipulation of the heating equipment and for enhancing the reliability of the inverter circuit.

Other objects, features and advantages of the induction heating equipment according to the present invention will become apparent from the following detailed description of the invention as taken in conjunction with the accompanying drawings in which like reference numerals and characters designate corresponding parts and elements throughout the figures and in which.

Figure 1:
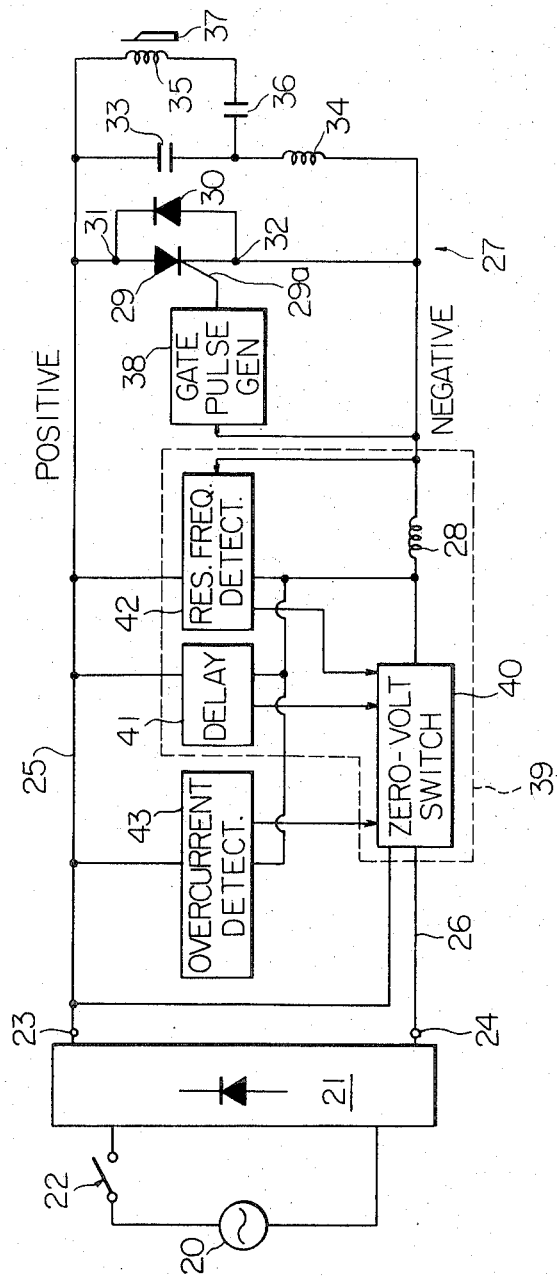
FIG. 1 is a block diagram showing an overall electrical arrangement of the induction heating equipment according to the present invention.

Reference is now made to the drawings, first to FIG. 1 illustrating an overall electrical arrangement of the inverter circuit of the induction heating equipment according to the present invention. As illustrated, the inverter circuit has a source 20 of an alternating current and a full-wave rectifier unit 21 connected to the a.c. power source 20 through an actuating switch 22. The rectifier unit 21 is typically of the usual bridge type, having positive and negative terminals 23 and 24, respectively. The full-wave rectified output from the rectifier unit 21 is fed to positive and negative bus lines 25 and 26 through these terminals 23 and 24, respectively, and energizes a self-exciting inverter unit of the chopper type which is designated generally by reference numeral 27.

This inverter unit 27 includes a filter inductor 28 interposed in the negative bus line 26, and a combination of a silicon controlled rectifier 29 and a diode 30 which are connected between the positive and negative bus lines 25 and 26, respectively, in opposite directions. More specifically, the silicon controlled rectifier 29 has an anode terminal connected to the positive bus line 25 and a cathode terminal connected to the negative bus line 26 while the diode 30 has an anode terminal connected to a node 31 between the anode terminal of the silicon controlled rectifier 29 and the positive bus line 25 and an anode terminal connected to a node 32 between the cathode terminal of the silicon controlled rectifier 29. This silicon controlled rectifier 29 is typically a thyristor which is gate-controlled.

The inverter unit 27 further includes a resonance circuit having a commutating capacitor 33 and a commutating inductor 34 which are serially connected between the positive and negative bus lines 25 and 26. The capacitor 33 and inductor 34 thus form loops respectively passing through the silicon controlled rectifier 29 and diode 30. The commutating capacitor 33 has one electrode connected to an induction heating coil 35 and the other electrode connected to a smoothing capacitor 36 through a junction intervening between the commutating capacitor 33 and resonance inductor 34. The induction heating coil 35 and smoothing capacitor 36 are thus connected serially to the positive bus line 25 and are driven from the commutating capacitor 33. During operation, the induction heating coil 35 is subjected to a load 37 which may be a cooking pan or pot where the inverter circuit of the shown construction is used in a cooking equipment of the induction heating type. A varying magnetic field is established in the load 37 by magnetic induction of the coil 37 so that the temperature of the load is increased as a result of eddy current and hysteresis losses created in the load.

The silicon controlled rectifier 29 has a gate terminal 29a through which it is triggered by a gate pulse generator 38 connected to the negative bus line 26.

The above described construction of the inverter circuit is of the usual nature adapted to be incorporated in the induction heating equipment and, as such, no further description as to the details of each of the elements will be incorporated herein.

In accordance with the present invention, the inverter circuit is further provided with means adapted to protect the inverter unit 27 during a condition in which the inverter circuit is being actuated with the switch 22 closed or a condition in which an unusually increased voltage or a rush current is produced in the circuit. Such protective means is designated generally by reference numeral 39. Where it is desired that the inverter unit 27 be actuated at all times at an instant when the voltage supplied thereto reaches a zero value, the protective means 39 may include a switching circuit 40 connected between the filter inductor 28 and the negative terminal 24 of the rectifier unit 21 as shown. This switching circuit 40 will be hereinafter referred to as the zero-volt switching circuit because it is responsive to the condition in which the voltage supplied from the rectifier unit 21 is at a zero level. Where such zero-volt switching circuit 40 is incorporated in the inverter circuit according to the present invention, the switching circuit may be cooperatively associated with a delay circuit 41 adapted to retard the delivery of the pulse train from the gate pulse generator 38 until the voltage across the pulse generator reaches a predetermined level, and a resonance frequency detecting circuit 42 adapted to detect the resonance frequency of the resonant current flowing through the silicon controlled rectifier 29 and diode 30, such frequency being varied depending upon the material of the load 37 to which the induction coil 35 is subjected during operation. In addition to these cricuits 41 and 42, an over-current detecting circuit 43 may be associated with the zero-volt switching circuit 40. This over-current detecting circuit 43 is adapted to detect production of an unusual current in the inverter circuit in the event the inverter circuit is subjected to a load of aluminium, stainless steel or other materials which are incompatible with the inverter circuit. Detailed constructions and arrangements of these circuits 41, 42 and 43 will become apparent as the description proceeds.

Figure 2:
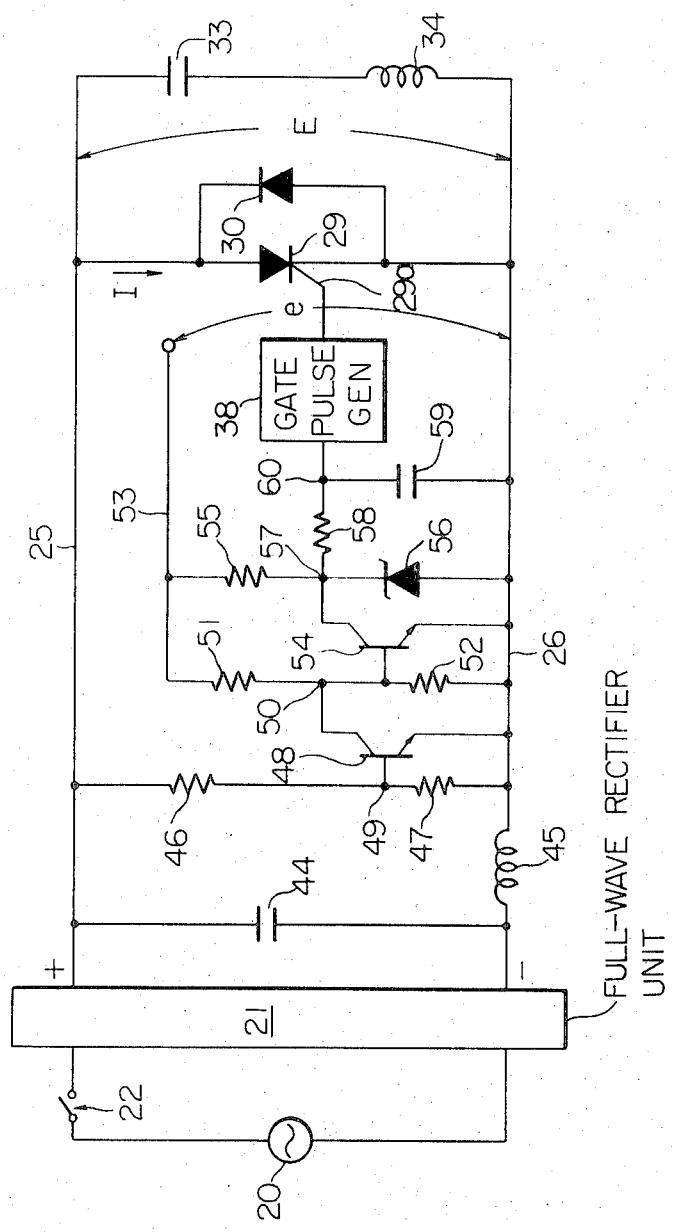
FIG. 2 is a schematic circuit diagram showing a preferred form of inverter protective means for the inverter circuit of the induction equipment shown in FIG. 1.

A first preferred form of inverter protective means for protecting the inverter unit from incurring a damage during the condition in which the inverter circuit is being actuated is shown in FIG. 2. Referring to FIG. 2, the inverter circuit has a filter capacitor 44 connected between the positive and negative bus lines 25 and 26, respectively, and a filter induction element or filter inductor 45 interposed in the negative bus line 26. Resistors 46 and 47 are serially connected between the bus lines 25 and 26 for dividing the supplied voltage E into fractions with a desired ratio. A fraction of the voltage E is fed to the base electrode of a p-n-p transistor 48 through a node 49 intervening between the resistors 46 and 47. This transistor 48 has an emitter electrode connected to the negative bus line 26 and a collector electrode connected to a junction 50 between resistors 51 and 52. These resistors 51 and 52 are serially connected between the negative bus line 26 and another positive bus line 53 establishing a d.c. voltage of $e$ with respect to the negative bus line 26. The resistors 51 and 52 thus divide this voltage $e$ into fractions with a desired ratio. A second p-n-p transistor 54 has a base electrode connected to a node between the node 50 and resistor 52 and an emitter electrode connected to the negative bus line 26. A resistor 55 and a constant voltage diode such as a zener diode 56 are serially connected between the positive bus line 53 and negative bus line 26. The collector electrode of the transistor 54 is connected to a node 57 between the resistor 55 and zener diode 56. The zener diode 56 sets up a constant voltage from the d.c. voltage $e$ between the bus lines 53 and 26. A timing circuit is connected between the node 57 and the gate pulse generator 38 previously mentioned. This timing circuit per se is known in the art and includes a resistor 58 connected between the node 57 and gate pulse generator 38 and a capacitor 59 connected between the negative bus line 26 and a node 60 intervening between the resistor 58 and pulse generator 38, as shown. Designated by reference numerals 29 and 30 are the silicon controlled rectifier and diode, respectively, and by reference numerals 33 and 34 are commutating capacitor and commutating inductor, respectively, which were all mentioned previously. The gate pulse generator 38 thus produces a pluse train so as to trigger the silicon controlled rectifier 29 in a timed fashion when a voltage of a predetermined level is set up across the capacitor 59 of the timing circuit.

In the electrical arrangement of the inverter circuit above described, the voltage E between the positive and negative bus lines 25 and 26, respectively, may suffice to saturate the p-n-p transistor 48. Through selection of the resistor 46 so that it has a relatively small resistance, therefore, it is possible to have a sufficient amount of base current achieved of the transistor 48 even when the voltage E between the bus lines 25 and 26 is at a relatively low level, especially under the condition in which the inverter unit is being initiated into action. Thus, the transistor 48 can be rendered conductive even when only a limited voltage is present between the bus lines 25 and 26. In this condition, the potentials at the collector electrode of the transistor 48 and at the negative bus line 26 are substantially equalized with each other so as to cut off the base current of the subsequent transistor 54. This results in interruption of the conduction between the collector and emitter electrodes of the transistor 54 so that a certain constant voltage is set up across the zener diode 56.

Figure 3:
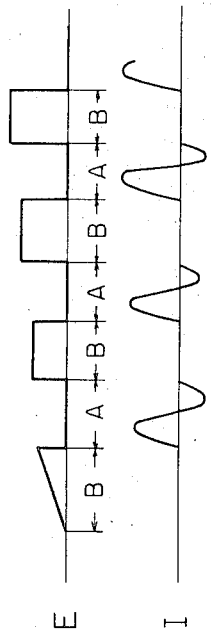
FIG. 3 shows graphs indicating waveforms of a voltage across the silicon controlled rectifier of the inverter circuit illustrated in FIG. 2 and a current flowing through the diode associated with the silicon controlled rectifier.

It will thus be understood from the foregoing description that not an electric power but a signal with a sufficiently small magnitude is fed back from the inverter unit to the gate pulse generator 38 so that the oscillation frequency attained in the inverter unit can be maintained sufficiently constant substantially irrespective of the levels of the voltage between the positive and negative bus lines 25 and 26, respectively. This can be clearly ascertained from the illustration of FIG. 3, in which the waveform of the current I flowing through the silicon controlled rectifier 29 and diode 30 of the inverter unit is indicated in correspondence with the waveform of the voltage E between the positive and negative bus lines 25 and 26, respectively. Thus, the current I flows through the silicon controlled rectifier 29 or the diode 30 during intervals denoted by A and, during intervals denoted by B, the voltage E is present between the bus lines 25 and 26. In these intervals B, the timing circuit made up of the resistor 58 and capacitor 59 is actuated so as to actuate the gate pulse generator 38 whereby the silicon controlled rectifier 29 is triggered and made conductive. The level of the voltage required for the constant voltage diode 56 to attain its breakdown region.

Figure 4:
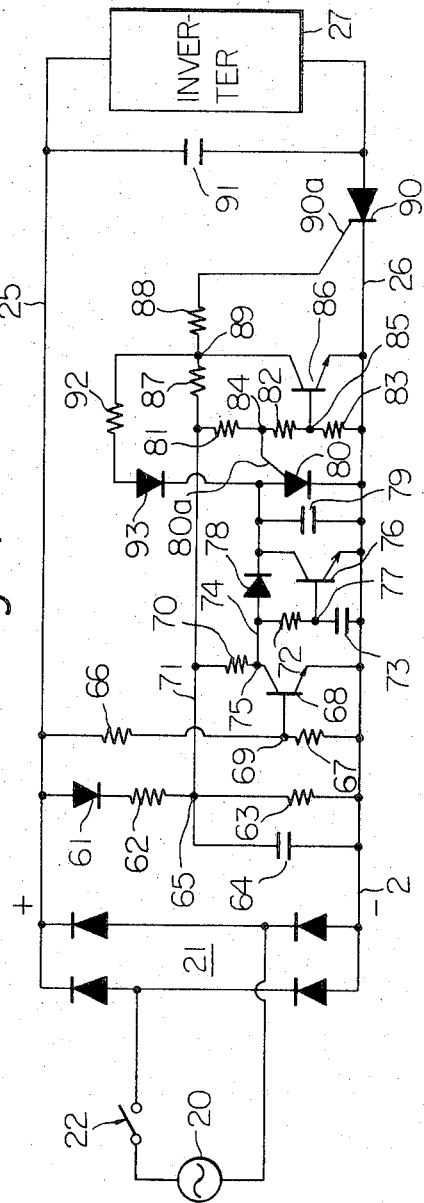
FIG. 4 is a schematic circuit diagram showing another preferred form of inverter protective means of the inverter circuit of the induction heating equipment illustrated in FIG. 1.

FIG. 4 illustrates a preferred form of zero-volt switching circuit which is adapted to actuate the inverter unit at all times at an instant when the voltage E delivered from the full-wave rectifier unit 21 is zero irrespective of the timing at which the actuating switch 22 is closed. Referring to FIG. 4, the zero-volt switching circuit has a rectifier 61 and two resistors 62 and 63 are serially connected between the positive and negative bus lines 25 and 26, respectively, leading from the full-wave rectifier unit 21 of the bridge connection. A capacitor 64 has one electrode connected to the negative bus line 26 and the other electrode connected to a node 65 between the resistors 62 and 63. This capacitor 64 is intended to serve as a d.c. power source for the zero-volt switching circuit. In order to detect zero volt between the bus lines 25 and 26, resistors 66 and 67 are serially connected between these bus lines 25 and 26 and a transistor 68 is connected through its base electrode to a node 69 intervening between these resistors 66 and 67. This transistor 68 has an emitter electrode connected to the negative bus line 26 and a collector electrode connected through a resistor 70 to a line 71 connected to the node 65 between the resistors 62 and 63 and accordingly to the d.c. power source or capacitor 64, as shown. The circuit thus made up of the resistors 66 and 67, transistor 68 and resistor 69 constitute a pulse generator producing at the collector electrode of the transistor 68 a pulse train which is in synchronism with the voltage from the rectifier unit 21.

Across the collector and emitter electrodes of the transistor 68 are connected a resistor 72 and a capacitor 73. More particularly, the resistor 72 is connected via a line 74 to a node 75 intervening between the resistor 70 and the collector electrode of the transistor 68 while the capacitor 73 is connected to the negative bus line 26. This capacitor 73 is adapted to drive a transistor 76 which has a base electrode connected to a node 77 between the resistor 72 and the capacitor 73. This transistor 76 has a collector electrode connected to the line 74 and an emitter electrode connected to the negative bus line 26. A rectifier 78 is interposed between the nodes on the line 74 connected to the resistor 14 and the collector electrode of the transistor 76 while a capacitor 79 is connected between the line 74 and the negative bus line 26. The circuit thus made up of the resistor 72, capacitor 73, transistor 76, rectifier 78 and capacitor 79 is a quick discharge circuit in which the capacitor 79 is discharged when the actuating switch 22 of the inverter circuit is opened and the inverter unit generally designated in a block form by reference numeral 27 is disconnected from the source of power 20.

A switching element 80 is connected between the rectifier 78 and negative bus line 26, viz., in parallel to the capacitor 79. This switching element 80 is such that it becomes conductive when the pulse train accumulated in the capacitor 79 reaches a predetermined voltage. An example of the switching element to suit this particular purpose is a programable unijunction transistor (PUT). A series of resistors 81, 82 and 83 are connected between the line 71 and the negative line 26. The switching element 80 has a gate terminal 80a which is connected to a node 84 intervening between the resistors 81 and 82. A node 85 intermediate between the resistors 82 and 83 is connected to the base electrode of a transistor 86 having an emitter electrode connected to the negative bus line 26.

The resistors 81, 82 and 83 are connected through the line 71 to the capacitor 64 serving as the d.c. power source and thus divide the supplied d.c. voltage into suitable fractions for thereby building up a potential at the gate terminal 80a of the switching element 80. Resistors 87 and 88 are serially interposed in the line 71 and accordingly to the d.c. power source 64. The collector electrode of the transistor 86 is connected to a node 89 between these resistors 87 and 88.

A silicon controlled rectifier 90 such as a thyristor has an anode terminal connected through a smoothing capacitor 91 to the positive bus line 25 and a cathode terminal connected to the negative bus line 26. The silicon controlled rectifier 90 has a gate terminal connected to the resistors 87 and 88 on the line 71.

The zero-volt switching circuit thus constructed and arranged may be used as it is but it is preferable that such circuit be provided with a holding circuit which is adapted to maintain the actuated condition of the switching element 80 once the element is actuated. The holding circuit to suit this particular purpose comprises a resistor 92 and a rectifier 93 which are serially connected between the line 74 and the node 89 between the resistors 87 and 88. More specifically, the rectifier 93 has its anode terminal connected through the resistor 92 to the node 89 and its cathode terminal connected to the line 74 at a node intervening between the anode terminal of the switching element 80 and the junction to which the capacitor 79 of the quick discharge circuit is connected.

The operation of the inverter circuit having the above described zero-volt switching circuit will now be explained with concurrent reference to FIGS. 4 and 5.

Figure 5:
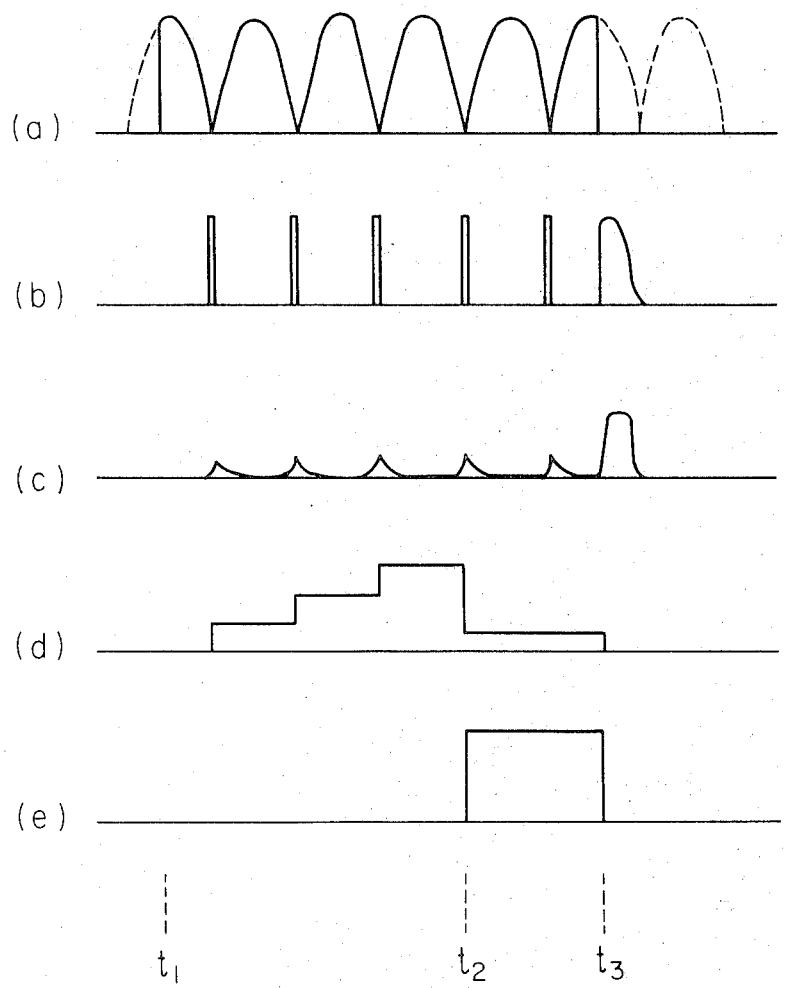
FIG. 5 shows graphs indicating waveforms of voltages appearing on various parts of the circuit illustrated in FIG. 4.

When the actuating switch 22 is closed at a time $t_1$ at which instant the d.c. voltage delivered from the full-wave rectifier unit 21 is higher than zero as seen in ($a$) of FIG. 5, a d.c. voltage is set up across the capacitor 64 acting as the source of power for the zero-volt switching circuit. A base current is fed to the transistor 68 through the resistor 66, which is accordingly rendered conductive. In this condition, the potential at the collector electrode of the transistor 68 is zero. Simultaneously, the voltage on the bus line 25 is divided into fractions by the resistors 81, 82 and 83 and thus a prescribed fraction of the supplied voltage is fed to the gate terminal of the switching element 80. While this occurs, the transistor 86 is also rendered conductive so that the gate and cathode terminals of the silicon controlled rectifier 90 are shunted by the resistor 88. The inverter unit 27 is consequently held at rest in the absence of an input signal on the gate terminal of the silicon controlled rectifier 90.

When, now, the voltage E delivered from the full-wave rectifier unit 21 falls in the neighbourhood of zero, then the base current on the transistor 68 is cut off so that the transistor 68 becomes non-conductive. A pluse train having a waveform indicated in ($b$) of FIG. 5 accordingly appears on the collector electrode of the transistor 68. The pulse-width of the pulses thus achieved is a presupposable value though it varies with certain parameters such as the small-signal common-emitter current gain ($h_{fe}$) and base-to-emitter voltage ($V_{BE}$) of the transistor 68 and/or the frequency of the supplied voltage E. This pulse train is fed to the quick discharge circuit including the transistor 76. Since, in this instance, the pulse-width of the pulses fed to this quick discharge circuit is usually so small that the pulses disappear before the voltage across the capacitor 73 of the discharge circuit is stepped up and since this capacitor 73 is discharged through conduction of the transistor 68, the voltage across the capacitor 73 is short in reaching a base-to-emitter voltage level required to render the transistor 76 conductive. The transistor 76 is consequently kept non-conductive. On the other hand, the voltage appearing on the collector electrode of the transistor 68 is accumulated on the capacitor 79. The voltage thus stored on the capacitor 79 is prevented from being discharged therefrom due to the blockade of the rectifier 78 with the result that the potential on the collector electrode of the transistor 76 assumes a stepped square waveform as indicated in ($d$) of FIG. 5. When the supplied voltage E reaches a zero level as at time $t_2$, then the potential on the collector electrode of the transistor 76 rises beyond the gating voltage of the switching element 80, which is consequently rendered conductive. Under this condition, the forward dropping voltage across the switching element 80 is about 0.6 volt so that the capacitor 79 maintains its potential.

When the switching element 80 thus becomes conductive, the voltage between the resistors 82 and 83 is affected by the forward dropping voltage across the switching element 80 and, as a result, the potential at the base electrode of the transistor 86 now approximates a ground potential so that the transistor 86 becomes non-conductive.

With the transistor 86 thus made non-conductive, a gate current flows through the resistors 87 and 88 to the silicon controlled rectifier 90, which is consequently rendered conductive so as to charge the capacitor 91 and accordingly energize the inverter unit 27. Since, thus, the supplied voltage E is zero at an instant when the silicon controlled rectifier 90 becomes conductive, the capacitor 91 is charged at a rate at which the supplied voltage rises so that a surge current does not flow through the capacitor 91. A flow-limiting resistance which would otherwise required for the protection of the full-wave rectifier unit 21 can therefore be dispensed with.

The transistor 86 is incipiently made conductive when the actuating switch 22 is closed as described above. To achieve a sufficient base current of the transistor 86 under this condition, it is necessary that the resistors 81 and 82 be selected so that they have limited resistance values. If these resistance values are reduced accordingly, then the switching element 80 will be disabled to maintain its actuated condition because of its specific characteristics with the result that the element 80 is made conductive and non-conductive repeatedly. This is avoided through provision of the holding circuit including the resistor 92 and rectifier 93. When, thus, the transistor 86 is rendered non-conductive, then the voltage having a waveform indicated in ($e$) of FIG. 5 appears on the collector electrode of the transistor 86 so that a current flows through the resistor 92 and rectifier 93 of the holding circuit, giving rise to an increase in anode current of the switching element 80. The switching element 80 is consequently capable of maintaining its conductive condition with certainty. The rectifier 93 herein used is intended to prevent the reverse flow of the pulse voltage through the resistor 92 to the anode terminal of the transistor 86 during the interval intervening between the times $t_1$ and $t_2$.

When the actuating switch 21 is opened at time $t_3$, then the transistor 68 is cut off so that the potential at the node 77 between the resistor 72 and capacitor 73 rises. The transistor 76 is consequently rendered conductive to cause the capacitor 69 to be discharged and concurrently the switching element 80 trips. An initial condition is in this manner restored so that the inverter circuit can be actuated stably even though the actuating switch 22 is closed immediately after it has been opened.

In case the actuating switch 22 is closed immediately after it has been opened in an inverter circuit not having the quick discharge circuit, then the transistor 86 will remain non-conductive because the discharge of the capacitor 79 is incomplete. Under this condition, the silicon controlled rectifier 90 will be rendered conductive simultaneously as the actuating switch 22 is closed, thereby making it impossible to actuate the inverter unit 27 to be actuated at an instant when the supplied voltage is at a zero level.

The inverval intervening between the times $t_1$ and $t_2$ is a delay time. This delay time can be adjusted by varying the gating voltage of the switching element 80 where desired. It is, in this instance, apparent the inverter circuit having the zero-volt switching circuit above described can be switched in even though such delay time is reduced to even zero.

It will now be appreciated from the foregoing description that the zero-volt switching circuit shown in FIG. 4 is adapted to produce a pulse a an instant when the supplied voltage is at a zero level and the silicon controlled rectifier forming part of the switching circuit is driven by the digital signal thus produced whereby the inverter unit is stably and reliably actuated in the zero-level condition at whichsoever moment the actuating switch may be closed. The provision of the quick discharge arrangement in the zero-volt switching circuit is useful for preventing malfunction of the inverter unit when the actuating switch is closed immediately after it has been opened. The holding circuit is associated with the switching element in the zero-volt switching circuit whereby the conductive condition of the switching element is maintained stably once the element has been made conductive.

Figure 6:
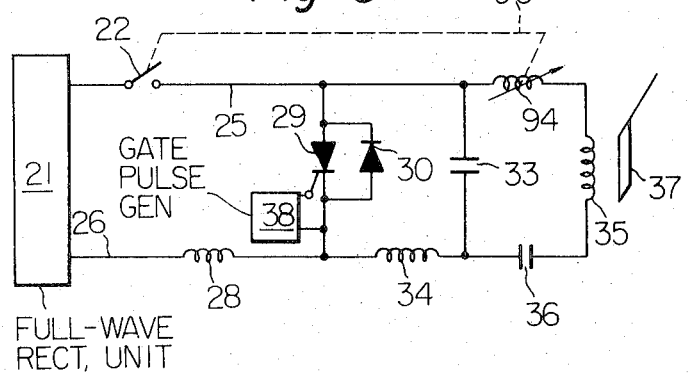
FIG. 6 is a schematic circuit diagram showing still another preferred form of inverter protective means for the inverter circuit of the induction heating equipment shown in FIG. 1.

FIG. 6 illustrates still another preferred form of inverter protective means of the inverter circuit of the induction heating equipment according to the present invention. This protective means is specifically adapted to hold the inverter unit inoperative in the event the inverter circuit is subjected to a load of a material which is objectionable from the performance characteristics of the circuit whereby the inverter circuit can be protected assuredly in such an occasion.

The inverter circuit shown in FIG. 6 is in itself similar to the circuit illustrated in FIG. 2, thus including the full-wave rectifier unit 21, inverter unit 27 including the filter inductor 28 gate pule generator 38, and filter capacitor 44, all of which were previously described in detail. The induction heating coil 35 forming part of the inverter unit 27 builds up an induced magnetic field to increase the temperature in the load 37. The smoothing capacitor 36 serially connected to this induction heating coil 35 delivers an a.c. power to the coil 35 and, when the inverter unit 27 is in an unloaded condition, the induction heating coil 35 and smoothing capacitor 36 have resonance points which are lower than the oscillation frequency of the inverter unit. Such resonance points of the coil 35 and smoothing capacitor 36 approximating the oscillation frequency of the inverter unit, the current flowing through the induction heating coil 35 nearly assumes a sinusoidal waveform.

In the arrangement shown in FIG. 6, there is provided a variable induction element 94 which is serially connected to the induction heating coil 35 in a loop including the commutating capacitor 33 and smoothing capacitor 36. This variable induction element 94 is associated with the actuating switch 22 of the inverter circuit. The variable induction element 94 cooperates with the switch 22 in such a manner that an increased inductance is achieved by the variable induction element 94 at an instant when the switch 22 is closed or opened. For this purpose, the variable induction element 94 may be connected to the actuating switch 22 through a suitable linkage 95 such as a mechanical linkage.

Figure 7:
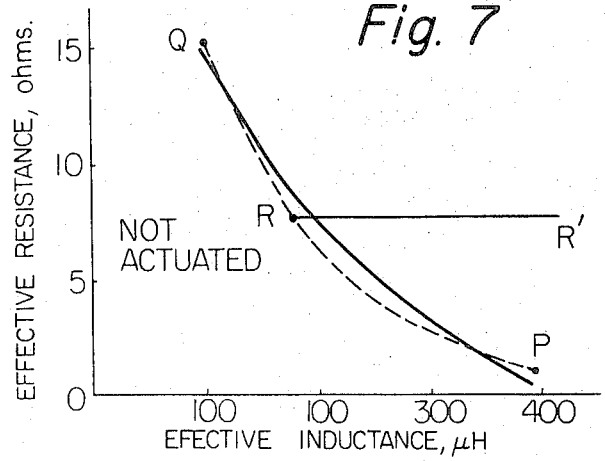
FIG. 7 is a graph showing a relationship between the effective inductance and effective resistance of a heating coil of the inverter circuit having the protective means shown in FIG. 6.

As previously discussed, the inverter circuit is liable to be subjected to considerable variation in the amount of load and thus tends to be actuated unstably especially where the inverter circuit is used in the cooking equipment of induction heating type. When the material to be heated is placed on the smoothing inductor 35, then the effective inductance of the inductor 35 diminishes and conversely the effective resistance thereof increases. As the effective inductance of the smoothing inductor 35 and filter capacitor 36 approach the oscillation frequency of the inverter circuit, it becomes extremely difficult to have the inverter circuit actuated in a stabilized condition. The graph of FIG. 7 illustrates those regions in which the inverter circuit can and cannot be actuated depending upon the relationship between the effective inductance in micro henry and effective resistance in ohm of the induction heating coil of the inverter circuit. These regions have a boundary curve joining points P and Q as indicated by a full line and the area above this boundary curve is in correspondence with the region in which the inverter circuit is capable of being actuated. When, thus, the material to be heated is placed nearer the induction heating coil, then the relationship between the effective inductance and resistance of the coil varies from point P to point Q. If, therefore, the material to be heated is positioned relative to the induction heating coil so that the relationship between the two parameters lies within the range below the boundary curve as at point R, then the inverter circuit fails to be actuated even thought the actuating switch has been closed. To eliminate this problem, it is herein proposed that the effective inductance of the induction heating coil is increased when the inverter circuit is to be actuated. The arrangement of the variable induction element 94 (FIG. 6) suits this purpose because the element 94 operates so as to set up an increased inductance whereby an increased impedance is achieved in the resonance circuit including the smoothing capacitor 36 and variable induction element 94. In other words, by increasing the effective inductance of the induction heating coil 35, the point R in the region in which the inverter circuit is unable to be actuated is relocated to point R' which is now located within the range in which the inverter circuit can be actuated properly. Upon completion of actuation of the inverter circuit, the linkage 95 for the variable induction element 94 is controlled so as to reduce the inductance of the element 94 so that the relation between the effective inductance and resistance reverts to the point R. The inverter circuit can be actuated stably and reliably in this manner irrespective of the presence and absence and the type of the load on the induction element.

Through provision of the variable induction element in the inverter circuit as above described, an advantage is additionally achieved in that a loss resulting from the Joule heat in the induction heating coil serially connected to the variable induction element can be substantially eliminated. The variable induction coil will be constructed in a simple, contactless configuration if it makes use of a ferrite core. Since, moreover, the variable induction element can be located independently of the inverter unit without consequent change in the performance of the unit, the element can be easily linked with the actuating switch and, if desired, can be located in close proximity to the induction heating coil for heating. Where the variable induction element is selected so that it has a relatively large inductance, then the impedance of the loop made up of the induction heating coil, smoothing capacitor and variable induction element will be augmented and accordingly the output of the inverter unit will diminish. The variable induction element can thus serve to control the power for the inverter unit. Where an arrangement is made so that the inductance of the variable induction element is increased when the actuating switch is opened as previously noted, the inverter output and accordingly the current flowing through the actuating switch will be significantly reduced so that discharge of arc from the switch can be prevented.

It will now be appreciated from the above description that the circuit arrangement shown in FIG. 6 is advantageous for assuring stabilized actuation of the inverter circuit and protection of the silicon-controlled rectifier of the inverter unit in the loaded and unloaded conditions of the inverter circuit and for preventing the arc discharge from the actuating switch.

Figure 8:
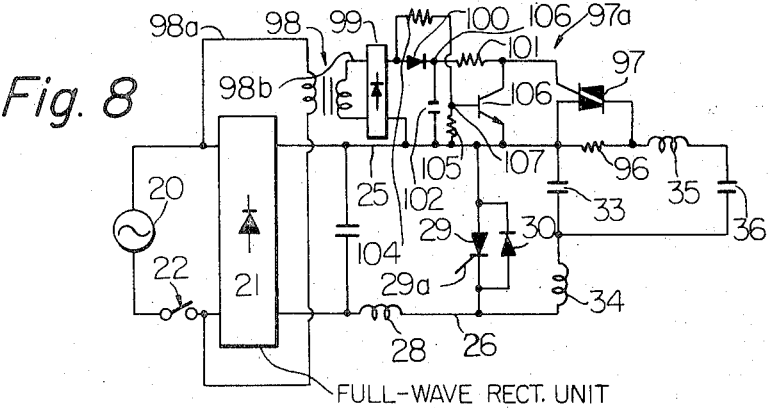
FIG. 8 is a schematic circuit diagram showing an inverter circuit having still another preferred form of inverter protective means in accordance with the present invention.

FIG. 8 illustrates a preferred form of protective means which is now adapted to protect the silicon controlled rectifier and diode forming part of the inverter unit due to an unusual rise in the voltage across these elements when the inverter circuit is actuated under an unloaded condition.

When the inverter circuit is actuated with a load applied thereto, then a standing voltage of a certain level will be immediately achieved across the silicon controlled rectifier and diode of the inverter unit. This voltage is smoothed but has a ripple factor of a considerable degree so that bottoms appear on the waveform of the voltage in correspondence with the cycles of the supplied power. Actually, the voltage is chopped at a high frequency in accordance with the gate signals. If the inverter circuit is actuated in an unloaded condition, a voltage approximately doubling the standing voltage achieved under the loaded condition is generated, thereby causing the silicon controlled rectifier and diode of the inverter unit to be damaged seriously. The circuit arrangement shown in FIG. 8 is intended to dampen out such unusually high voltage with a view of permitting the inverter circuit to be actuated stably not only in the loaded condition but in the unloaded condition.

Referring to FIG. 8, the parts and elements which have their counterparts in the circuit arrangement in FIGS. 1 and 2 are designated by like reference numerals and characters. In order to accomplish the above noted intent, the inverter circuit herein shown has a resistor 96 which is connected serially to the induction coil 35 for heating and in the loop including the capacitors 33 and 36. As will be described later, an arrangement is made in the inverter circuit shown in FIG. 8 so that this additional resistor 96 is shunted once the inverter circuit has been actuated. Referring to graph (a) of FIG. 9, if it happens that the resistor 96 (FIG. 8) is short-circuited at an instant when a peak value is reached by the supplied voltage, then the inverter circuit will has its parameters varied abruptly, thus causing unusual oscillations therein. As a consequence, an unusual rise in the voltage across the silicon controlled rectifier and diode of the inverter unit is invited as in the case of the prior art inverter circuit under the unloaded condition. If, however, the resistor 96 (FIG. 8) is short-circuited when the supplied voltage is at or in the vecinity of a zero level, then generation of the unusually high voltage can be prevented even though unusual oscillation take place in the inverter unit, as will be evidently seen in graph (b) of FIG. 9. This will be achieved in such a manner that a d.c. power with a relatively high ripple percentage is supplied to the chopper type inverter unit and that the resistor serially connected to the induction heating element is short-circuited at a very instant when the supplied voltage is at or in the neighbourhood of a zero level.

Turning back to FIG. 8, the arrangement of this character includes as an essential element thereof a bidirectional triode thyristor 97 which is connected serially to the induction heating coil 35 and across the resistor 96. This bidirectional triode thyristor 97 has a gate terminal 97a. On the other hand, a transformer 98 has a primary winding 98a connected to the input terminals of the full-wave rectifier unit 21 in a manner to be energized when the actuating switch 22 is closed and has a secondary winding 98b connected to a rectifier 99. The rectifier 99 has one output terminal connected to the positive bus line 25 of the inverter circuit and the other output terminal connected through rectifier 100 to a resistor 101. This rectifier 100 has an anode terminal connected to the rectifier unit 99 and a cathode terminal connected to the resistor 101 so as to prevent a reverse flow of the d.c. current therethrough. A capacitor 102 is connected between the positive bus line 25 of the inverter circuit and a node 103 intervening between the rectifier 100 and resistor 101. A d.c. voltage of zero level appearing between the rectifier unit 99 and capacitor 102 is detected by the limiting rectifier 100. The resistor 101 is connected to the gate terminal 97a of the bidirectional triode thyristor 97.

Between the output terminals of the rectifier unit 99 are serially connected resistors 104 and 105, wherein the resistor 104 is connected between the rectifier unit 99 and rectifier 100 and the resistor 105 connected to the positive bus line 25 of the inverter circuit. A transistor 106 has a base electrode connected to a junction 107 between these resistors 104 and 105. The emitter electrode of this transistor 106 is connected to the positive bus line 25 and accordingly to the negative electrode of the capacitor 102 while the collector electrode thereof is connected to a node 108 intermediate between the resistor 101 and the gate terminal 97a of the bidirectional triode thyristor 97. The circuit arrangement from the transformer 98 to the bidirectional triode thyristor 97 thus acts to short-circuit the resistor 96 in response to a zero level of the d.c. voltage supplied from the full-wave rectifier 21.

Figure 9:
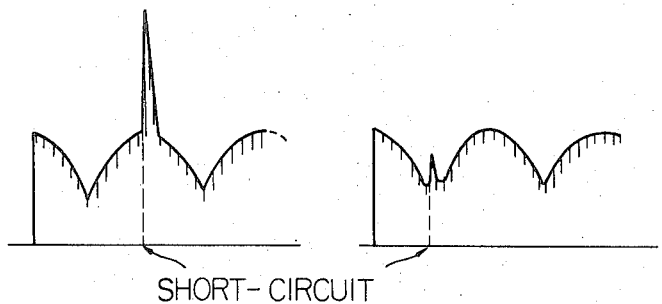
FIG. 9 shows graphs respectively indicating waveforms of the voltages applied to the inverter circuits with and without the protective means forming part of the inverter circuit of FIG. 8.

When, in operation, the actuating switch 22 is closed, then the chopper type inverter unit 27 is immediately actuated. In this condition, the voltage E between the positive and negative bus lines 25 and 26, respectively, of the inverter circuit is prevented from being stepped up to an usually high level through provision of the resistor 96 connected serially to the induction heating coil 35. The inverter unit 27 can be initiated into action in a fully stabilized condition in this manner. Under this condition, a full-wave rectified, relatively low voltage is produced from the transformer 98 and rectifier unit 99 and impressed upon the node 107 between the resistors 104 and 105 and accordingly across the resistor 105. It therefor follows that the transistor 106 is cut off when the supplied voltage reaches a zero level. If, therefor, the actuating switch 22 is closed at the very instant at which the supplied voltage is peaked up as indicated in FIG. 9, then a base current will flow through the resistor 104 to the transistor 106, which is consequently rendered conductive. This causes the bidirectional triode thyristor 97 to have its gate terminal short-circuited to the cathode terminal so that the thyristor 97 remains non-conductive. When the supplied voltage reaches a zero level, then the base current of the transistor 106 is also made zero and thus the transistor 106 is cut off. In this condition, a current determined by the voltage across the capacitor 102 and resistor 101 flows to the gate terminal 97a of the bidirectional triode thyristor 97, which is consequently rendered conductive so as to cause the resistor 96 to be short-circuited by the thyristor 97. The voltage which is impressed upon the silicon controlled rectifier 29 and diode 30 of the chopper type inverter unit 27 is substantially unchanged at the very moment when the resistor 96 is short-circuited as will be seen from the graph (b) of FIG. 9. The inverter unit 27 is in this manner actuated in a satisfactorily stabilized condition without an unusual voltage applied to the silicon controlled rectifier 29 and diode 30. The curves indicated in FIG. 9 are actually envelopes of high-frequency chopped voltages.

Once the bidirectional triode thyristor 96 has been rendered conductive in a manner above described, it is disabled or turned off and remains conductive irrespective of the output signal from the zero-volt detector arrangement connected thereto.

When the actuating switch 22 is opened, the bidirectional triode thyristor 97 restores its initial or non-conductive condition during the down-time period so that the resistor 96 is ready to be effective when the actuating switch 22 is closed for a second time.

It will now be appreciated from the above description that, by reason of the provision of the additional resistor connected to the heating induction element, the inverter circuit of the construction shown in FIG. 8 is capable of being actuated in a satisfactorily stabilized condition substantially without respect to the timing at which the actuating switch of the circuit is closed. This resistor being short-circuited once the inverter circuit has been actuated, waste of power can be avoided so as to provide economy of operation of the induction heating equipment using the described inverter circuit.

It may be noted that the voltage ratings of the silicon controlled rectifier and diode of the chopper type inverter unit can be selected merely in consideration of the standing voltage applied thereto and, for this reason, relatively inexpensive silicon controlled rectifier and diode may suit the purpose.

Figure 10:
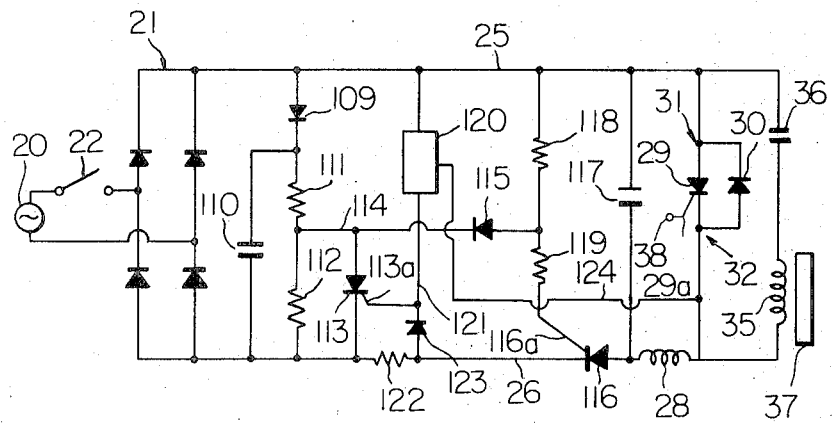
FIG. 10 is a schematic circuit diagram showing an inverter circuit having still another preferred form of protective means adapted to protect the inverter circuit in the event an unusual load is applied to the circuit.

Reference is now made to FIG. 10 which illustrates a circuit arrangement including the resonance frequency detecting circuit 42 adapted to hold the inverter circuit through detection of unusual resonance frequencies of the current flowing through the silicon controlled rectifier and diode of the chopper type inverter unit and the overcurrent detecting circuit 43 responsive to an unusual current produced in the inverter circuit in the event the inverter circuit is subjected to an objectionable load, as mentioned in connection with the circuit arrangement shown in FIG. 1.

In the circuit arrangement shown in FIG. 10, a rectifier 109 and a capacitor 110 are serially connected between the positive and negative bus lines 25 and 26, respectively, of the inverter circuit for producing a d.c. voltage which is to be used as a source of power for the control circuit of the inverter unit. Resistors 111 and 112 are serially connected across the capacitor 110 for dividing the voltage between the electrodes thereof to fractions with a desired ratio. The rectifier 109 thus has its anode terminal connected to the positive bus line 25 and its cathode terminal connected to the capacitor 110 and to the resistor 111. A thyristor 113 is connected across the resistor 112 through the negative bus line 26 and a line 114 connected to a junction between the resistors 111 and 112. Thus, the fraction of the voltage divided by the resistors 111 and 112 appears between the anode and cathode terminals of the thyrister 113, the anode and cathode terminals being connected respectively to the line 114 and negative bus line 26. The line 114 is connected to a rectifier 115 having its cathode terminal directed to the anode of the thyristor 113. Between the bus lines 25 and 26 is connected a thyristor 116 having an anode terminal connected to the positive bus line 25 through a filter capacitor 117 and a cathode terminal connected to the negative bus line 26. This thyristor 116 has a gate terminal 116a connected serially to resistors 118 and 119 which in turn are connected to the positive bus line 25. The rectifier 115 is connected through its anode terminal to a junction between the resistors 118 and 119. Thus, when the thyristor 113 becomes conductive, then the gate and cathode terminals of the thyristor 116 are short-circuited through the resistor 119 and rectifier 115 so that the thyristor 113 becomes or ready to become non-conductive. In order to render this thyristor 113 conductive, the capacitor 117 should be so selected as to have a relatively small capacitance so that a relatively high voltage with a ripple component appears across the capacitor. When the voltage supplied from the full-wave rectifier unit 21 reaches a zero level at a cycle corresponding to the half-wave of the voltage, then the charges stored in the capacitor 117 are drawn to the cathode terminal of the thyristor 113 through the positive bus line 25, rectifier 109 and resistors 111 and 112 in this sequence. The thyristor 113 is consequently cut off.

A timing circuit 120 using, for instance, a monostable multi-vibrator is connected between the positive bus line 25 and the gate terminal 113a of the thyristor 113 through a line 121. When a signal is present at the output terminal of the timing circuit 120, the thyristor 113 is triggered and accordingly the thyristor 116 is cut off, thereby holding the inverter unit 27 inoperative.

Between the cathode terminal of the thyristor 116 and the negative output terminal of the full-wave rectifier unit 21 is connected a resistor 122, which is connected through a rectifier 123 to the gate terminal 113a of the thyristor 113 and to the line 121 leading from the timing circuit 120. When, thus, an unusual current is created in the inverter unit 27, an increased voltage drop is caused across the resistor 122 and thus a current flows through the rectifier 122 to the base terminal 113a of the thyristor 113. The thyristor 113 is consequently turned conductive so that the inverter unit 27 is made inoperative. The resistor 122 and rectifier 123 thus make up a circuit for detecting an unusual current in the inverter unit.

Once the thyristor 113 is rendered conductive as above discussed, a d.c. voltage is impressed thereon so that the thyristor 113 remains conductive and thus memorize the unusual condition. This thyristor 113 can not be turned off unless the actuating switch 22 is opened and, therefore, the oprerator will now become aware that the load on the inverter is of the objectionable nature. The operator will then open the actuating switch and remove the load from the heating equipment. The inverter circuit can thus be protected from incurring damage that would otherwise result from the application of the objectionable load to the inverter circuit.

The chopper type inverter unit 27 invariably includes a silicon controlled rectifier 29 connected across the capacitor 117 through a filter inductor 28, and a diode 30 connected across the silicon controlled rectifier 29 through nodes 31 and 32 as previously discussed. Across these nodes 31 and 32 are serially connected a heating induction coil 35 to be subjected to the load 37 and a commutating capacitor 36. The induction heating coil 35 and capacitor 36 thus constitute a loop passing through the silicon controlled rectifier 29 and a loop passing through the diode 30. The timing circuit 120 is connected to a junction between the node 32 and filter inductor 28 through a line 124. The gate terminal 29a of the silicon controlled rectifier 29 is connected to a gate pulse generator which is generally designated by reference numeral 38 as previously discussed.

Figure 11:
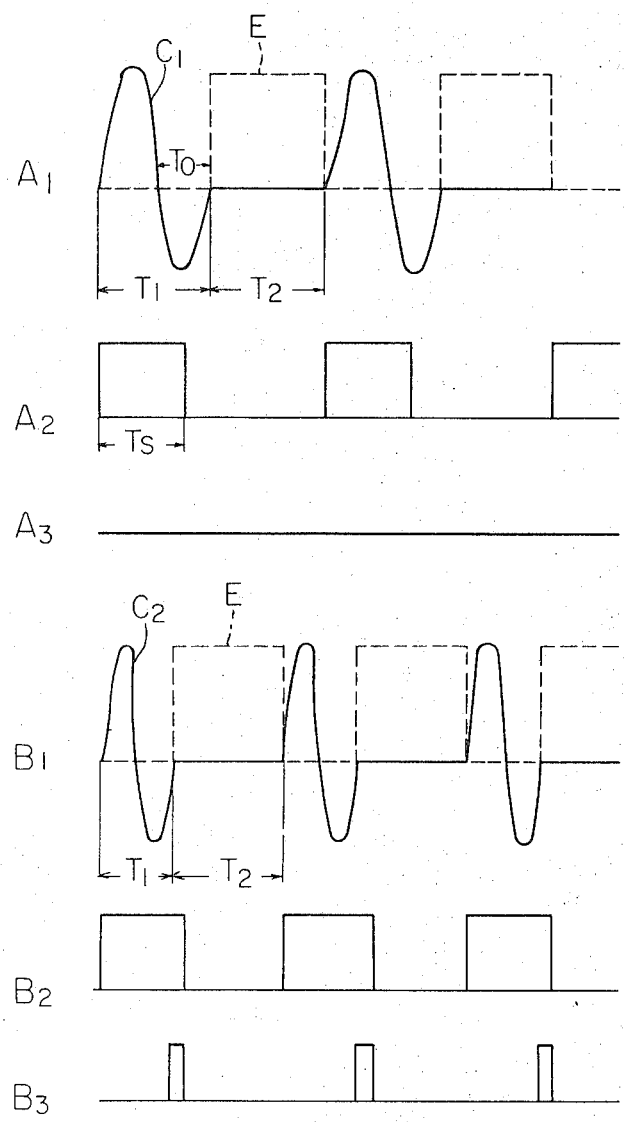
FIG. 11 shows graphs indicating waveforms of the voltages and currents appearing on some parts of the inverter circuit shown in FIG. 10 under a usual condition and in a condition in which an unusual load is applied to the inverter circuit.

When the actuating switch 22 is closed, then the gate pulse generator 38 triggers the silicon controlled rectifier 29 in a timed fashion. The silicon controlled rectifier 29 is consequently turned conductive so that an oscillating current is produced by the induction heating coil 35 and commutating capacitor 36. The current drawn from the capacitor 117 then flows through the silicon controlled rectifier 29 from the node 31 to the node 32 during one half of each of the cycles and through the diode 30 from the node 32 to the node 31, viz., in the opposite direction, during another half of each of the cycles of the current, as indicated by the waveform I in the graph $A_1$ of FIG. 11. When one cycle of the oscillating current I terminates, then the silicon controlled rectifier 29 becomes nonconductive so that a voltage E appears across the nodes 31 and 32, viz., between the positive bus line 25 and the line 124 interconnecting the cathode terminal of the silicon controlled rectifier 29 and the timing circuit 120. This voltage is indicated by a waveform E in broken lines in the graph $A_1$ of FIG. 11. The gate pulse generator 38 then triggers the silicon controlled rectifier 29 upon lapse of a predetermined interval so that the waveforms I and E are repeated. In FIG. 11, the duration of one cycle of the oscillating current I is assumed to be $T_1$ in which the duration of the flow of the current through the diode 30 (FIG. 10) is assumed to be $T_o$, while the duration in which the voltage E appears across the nodes 31 and 32 is assumed to be $T_2$. During the time interval of $T_o$, the silicon controlled rectifier 29 is cut off in consequence of the characteristics of the inverter circuit per se. With the high-frequency current thus flowing through the induction heating coil 35, a varying magnetic field is induced in the material 37 placed adjacent the coil 35 with a consequent increase in the temperature of the material.

The operation of the inverter circuit of the above noted character will now be described in more detail with reference to FIG. 11 wherein the graphs $A_1$, $A_2$ and $A_3$ are related to an operation in which the inverter circuit is subjected to a load operable with the circuit and the graphs $B_1$, $B_2$ and $B_3$ to an operation in which the circuit is subjected to an objectionable load. The signals indicated in the graphs $A_2$ and $B_2$ are those produced by the monostable multi-vibrator forming part of the timing circuit 120. The graphs $C_1$ and $C_2$ indicate the signals appearing on the line 121 connecting the timing circuit 120 to the gate terminal of the thyristor 113 and to the rectifier 123 (FIG. 10), viz., the signals which are delivered from the timing circuit in those time intervals during which the voltage E is present in the presence of the signal voltage from the monomultivibrator of the timing circuit. This monomulti-vibrator operates in response to the zero level of the voltage E and thus produces output signals having a duration indicated by $T_s$ in the graphs $B_1$ and $B_2$.

During the condition in which the inverter circuit is subjected to a load permissible from the characteristics of the circuit, the time intervals $T_s$ is shorter than the durations $T_1$ of the cycles of the current I so that the timing circuit 120 delivers no output signal on the line 121 as seen in the graph $A_3$ in FIG. 11. When, however, an objectionable load is applied to the inverter circuit, the inductance of the induction heating coil 35 is changed by the magnetic permeability of the load so that the durations of the oscillation cycles are shortened. As a consequence, the time intervals $T_o$ during which the silicon controlled rectifier 29 is kept nonconductive are shortened as seen in the graph $B_1$, there now being the possibility that the flow reversing operation is jeopardized. Under this condition, the time intervals $T_s$ of the signals from the monomulti-vibrator in the timing circuit 120 become shorter than the durations $T_1$ of the cycles of the oscillating current I, thereby giving rise to production of the signals on the output of the timing circuit 120, as seen in the graph $B_3$. The pulses thus produced are delivered to the gate terminal 113 of the thyristor 113, which is consequently triggered. The gate terminal 116a and cathode terminal of the thyristor 116 are therefore shortcircuited by the resistor 119 and rectifier 115 so that the inverter unit 27 is switched off. The inverter circuit thus tripping in the presence of the objectionable load, the silicon controlled rectifier 29 and the associated diode 30 can be protected from incurring a damage.

Although the timing circuit 120 has thus far been described as being constructed to be responsive to the shortened time intervals of the cycles of the oscillating current I, such is merely by way of example. It should therefore be noted that the timing circuit may be constructed in such a manner as to produce an output signal in response to unusually prolonged intervals of the cycles of the oscillating current.

Provision of the resistor 122 and rectifier 123 between the two thyristors 113 and 116 is advantageous for preventing the silicon controlled rectifier 29 from being damaged by flow of an overcurrent in the forward direction therethrough as would invited occasionally.

Figure 12:
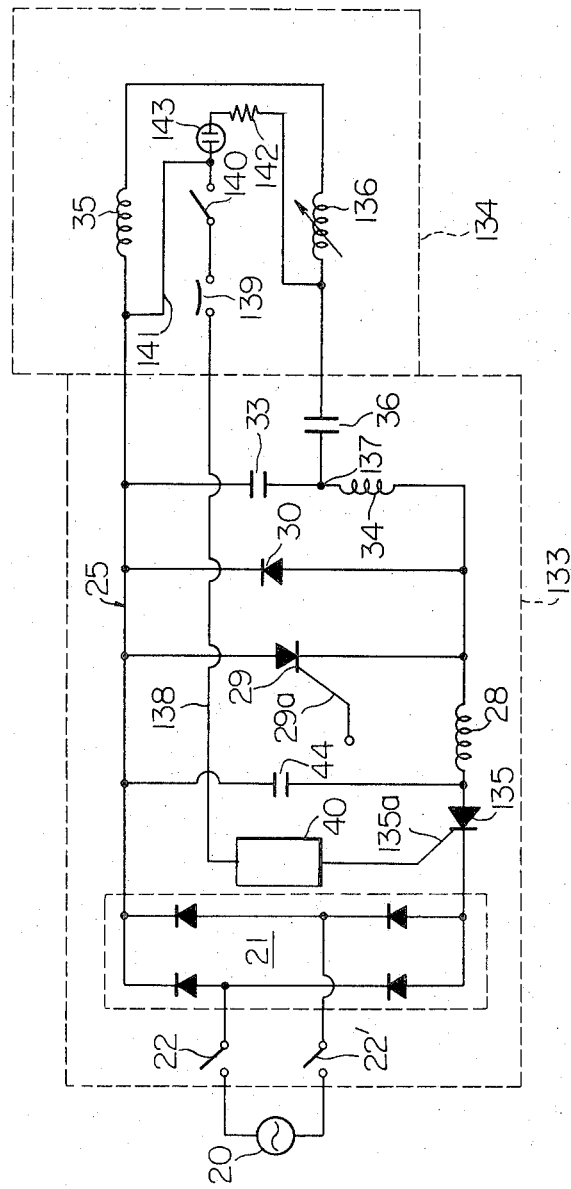
FIG. 12 is a schematic circuit diagram showing still another preferred form of inverter circuit having an induction coil separated from an oscillation circuit forming part of the inverter circuit.

Turning now to FIG. 12, there is illustrated still another preferred form of inverter circuit arrangement which is now adapted to prevent the flow of a rush current through the filter capacitor for the inverter unit, to enable the inverter unit to be actuated when the supplied voltage is at or in the vicinity of zero level, to provide utmost eash of manipulation of the induction heating equipment and to permit the use of wiring with a relatively small capacity to provide economy of production.

The circuit arrangement is herein shown as being largely made up of a chopper type inverter unit 133 and an induction heating control unit 134. Similarly to the circuit arrangements thus far described, the inverter unit 133 includes a full-wave rectifier unit 21 connected to the a.c. power source 20 via actuating switches 22 and 22' for delivering a d.c. voltage across the positive and negative bus lines 25 and 26, respectively. A smoothing capacitor 44 is connected between these bus lines 25 and 26. A silicon controlled rectifier 29 having a gate terminal 29a and a diode 30 are connected in parallel to the bus lines 25 and 26 in opposite directions as previously explained. The cathode terminal of the silicon controlled rectifier 29 and anode terminal of the diode 30 are serially connected to a filter inductor 45 and a second silicon controlled rectifier 135 through the negative bus line 26. This silicon controlled rectifier 135 has its anode terminal connected to the silicon controlled rectifier 29, diode 30 and filter capacitor 44 and its cathode terminal connected to the negative output terminal of the full-wave rectifier unit 21, as shown. The silicon controlled rectifier 135 has a gate terminal 135a connected to a previously described zero-volt switching circuit which is generally designated by reference numeral 40. The inverter unit 133 further includes a commutating capacitor 33 and a commutating inductor 34 which are serially connected between the positive and negative bus lines 25 and 26, respectively.

The induction heating control unit 134, on the other hand, includes an induction heating coil 35 and an output control variable induction element 136 which is connected serially to the positive bus line 25 through the induction heating coil 35 and through a smoothing capacitor 36 to a node 137 intervening between the commutating inductor 34 and capacitor 33.

The zero-volt switching circuit 40 serves as a gate pulse generator for triggering the silicon controlled rectifier 135 through its gate terminal 135a. This gate pulse generator 40 is serially connected through a line 138 to an overheat responsive switch 139 and an induction heating control switch 140 which, in turn, are serially connected to the full-wave rectifier unit 21 through a line 141 and the positive bus line 25. It is, in this instance, important that the overheat responsive switch 140 be located in the neighbourhood of the induction heating coil 35 so as to protect the coil from being overheated during operation. The induction heating control switch 139 is also accommodated in the induction control unit 134. The switches 139 and 140 are also serially connected through a voltage-drop resistor 142 to a node between the variable induction element 136 and smoothing capacitor 36. Designated by reference numeral 143 is a glow lamp which may preferably be provided in the induction heating control unit 134 for indicating an actuated condition of the induction heating equipment.

When, in operation, the power switches 22 and 22' and the induction heating control switch 140 are closed concurrently, then the gate pulse generator or zerovolt switching circuit 40 is actuated through the lines 25 and 141 and switches 139 and 140. The silicon controlled rectifier 135 is consequently triggered in the presence of an input signal on its gate terminal 135a whereby the inverter unit 133 in its entirety is actuated.

While this occurs, the voltage supplied from the full-wave rectifier unit 21 rises from the vicinity of zero level, a relatively small rush current flows through the filter capacitor. Under this condition, an unusually increased voltage appears between the anode and cathode terminals of the silicon controlled rectifier 29 as previously noted. Production of such an increased voltage can be avoided in the shown circuit arrangement because a voltage approximating a zero level is supplied to the inverter unit 133 as above mentioned.

If the induction heating control switch 140 is arranged so as to be remote-controlled, the construction of the induction heating equipment as a whole will be considerably simplified and production cost of the equipment will be reduced to a significant degree. The use of such remotely controlled switch as the control switch 140 will further contribute to enhancing the ease of manipulatory procedures on the part of the operator.

Figure 13:
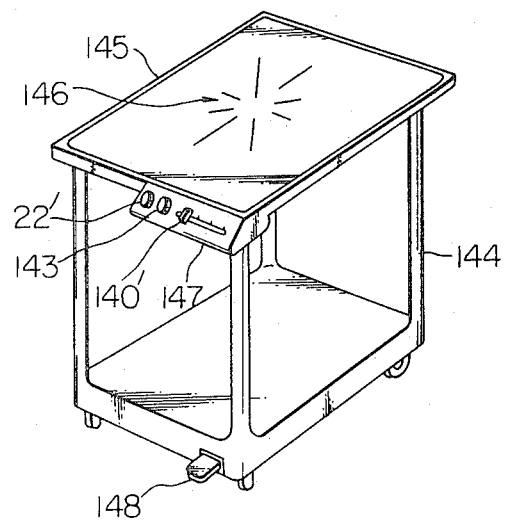
FIG. 13 is a perspective view showing an induction heating equipment for cooking uses wherein the circuit arrangement shown in FIG. 13 is incorporated.
Figure 14:
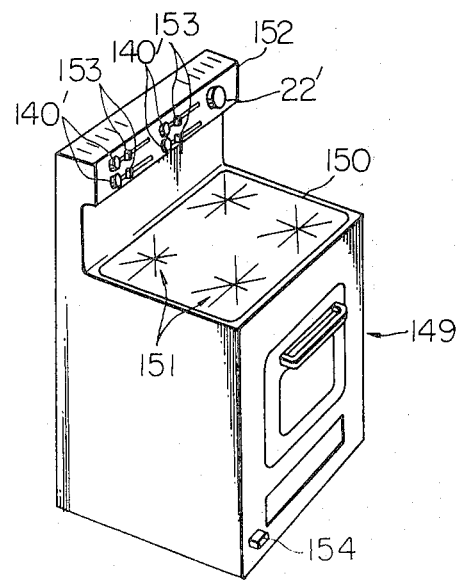
FIG. 14 is a view similar to FIG. 14 but now shows another form of induction heating equipment for cooking uses incorporating the circuit arrangement of FIG. 13.

Examples of the induction heating equipment using the circuit arrangement above described are illustrated in FIGS. 13 and 14.

The induction heating equipment shown in FIG. 13 is of the wagon type having a carrier 144, a top panel 145 having an indicator 146 and a control board 147. The inverter unit 133 (FIG. 12) is accommodated in the carrier 144 and the induction heating coil 35 (FIG. 12) is located underneath the top panel 145. The control board 147 is provided with the actuating switch 22', induction heating control switch or knob 140' and indicator light 143 forming part of the circuit arrangement shown in FIG. 12. Designated by reference numeral 148 is a pedal which is interlocked with the actuating switch 22.

In the induction heating equipment of the shown construction, the induction heating control switch 140 actually serves as a power switch for the equipment and is thus manipulated far more frequently than the actual power switch 22. It is, for this reason, most preferable for the purpose of providing ease of control over the equipment that the induction heating control switch 140' be positioned on the control board 147 which is located adjacent the top panel 145.

This particular advance of the induction heating equipment shown in FIG. 13 will be more clearly appreciated if considered in comparison with the prior art equipment which uses no such means as the induction control switch 140 and accordingly the silicon controlled rectifier 135 (FIG. 12) in its inverter unit. In such prior art induction heating equipment, the power switch (which corresponds to the control pedal 148) is used to directly actuate the equipment and, where it is desired to have the power switch located near the top panel as in the control board associated with the top panel for providing ease of manipulating the switch, then it is required that wiring for power lines be provided at least two turns between the upper control board and the lower inverter unit and that the power lines be formed of wires with a relatively large capacity. This is apparently reflected by an increased production cost and reduced reliability of performance of the equipment. In contrast to the induction heating equipment having these problems, the equipment shown in FIG. 13 is advantageous in that a single wire having a relatively small capacity is used so as to provide connection between the gate pulse generator 40 and induction heating control switch through the line 138 (FIG.

12). The induction heating control switch 140' of the equipment shown in FIG. 13, moreover, may be of a relatively small capacity insofar as it is adapted to remotecontrol the switch 140 in the circuit arrangement shown in FIG. 12.

FIG. 14 illustrates an example of the oven type induction heating equipment incorporating the circuit arrangement shown in FIG. 12, wherein the advantages achieved in the equipment of the wagon type are maintained. The shown induction heating equipment includes an oven unit 149, a top panel 150 carrying indicators 151 and a control board 152 mounted over the top panel 150. The inverter unit is incorporated at the bottom of the oven unit 149 and a plurality of induction heating coils (not shown) are located underneath the indicators 151 on the top panel 150. The control board 152 carries a main power switch 22', induction heating control switches 140' and output control knobs 153 associated respectively with the control switches 140'. Designated by reference numeral 154 is a power pedal interlocked with the main power switch 22'. In the induction heating equipment thus using a plurality of induction heating coils, the wiring between the upper control board 152 and lower inverter unit can be constituted to the advantages of the production economy and performance reliability of the heating equipment probably more than the advantages achieved in the induction heating equipment of the wagon type previously described.

It is apparent that the arrangement shown in FIG. 12 can be incorporated not only in the induction heating equipment shown in FIGS. 13 and 14 but in other types of equipment wherein the induction heating coils are associated with and spaced apart from a single or centralized inverter unit, for example.

What is claimed is:

1. An induction heating equipment comprising an A.C. power source, a full-wave rectifier means connected to said A.C. power source, an inverter unit having a gate-controlled rectifier and a diode which are connected in parallel to said fullwave rectifier unit, a gating circuit connected to a gate terminal of said gate-controlled rectifier, a resonance circuit having a capacitor and an induction element which are connected in parallel to said gate-controlled rectifier, induction heating means connected to and driven by said resonance circuit, a filter capacitor and a filter inductor connected between said fullwave rectifier and said inverter unit, first means for protecting said gate-controlled rectifier from being destroyed by failure in reversing a current in said inverter circuit at the initial start-up, second means for protecting said gate-controlled rectifier when said induction heating equipment is energized, said second means comprising a zero-volt start-up circuit, third means for protecting said inverter unit from a surge voltage when said inverter unit is energized in the absence of materials to be heated, fourth means for protecting said inverter unit from an overcurrent flowing in the forward direction through said gatecontrolled rectifier and also protecting said inverter unit from failure in reversing a current in said inverter circuit caused by an abnormal oscillation, said second means comprising synchronous pulse generating circuit means connected between positive and negative terminals of said full-wave rectifier means for producing pulses in synchronism with each of the zero points of the output voltage from said rectifier unit, a quick discharging circuit means connected to said synchronous pulse generating circuit means, a capacitor connected across said quick discharging circuit means for accumulating said pulses, said quick discharging circuit means discharging charges stored on said capacitor when said induction heating equipment is de-energized, switching means connected to said synchronous pulse generating circuit means, said switching means being rendered conductive when said accumulated pulses reach a preset value, whereby said induction heating equipment is made to be energized at the zero point of the rectifier voltage.

2. An induction heating equipment as claimed in claim 1, in which said first means comprises a D.C. power source, a zener diode, voltage sensing means responsive to a relatively small voltage generated when said induction heating equipment is put into energization so as to apply said D.C. power source across said zener diode, timing circuit means connected across said zener diode to produce a first train of pulses having a predetermined repetition rate, and pulse generating circuit means responsive to said first train of pulses to produce a second train of pulses for triggering said gate-controlled rectifier, whereby said inverter unit is brought into a constant oscillatory condition by said second train of pulses at the instant said heating equipment is energized.

3. An induction heating equipment as claimed in claim 1, in which said second means further comprises means connected to said switching means for maintaining said switching means conductive once actuated.

4. An induction heating equipment as claimed in claim 1, in which said third means comprises a resistor serially connected to said induction heating means and short-circuiting means connected across said resistor for providing a short circuit across said resistor, said short-circuiting means including detecting means responsive to a zero voltage from said A.C. power source for causing said short-circuiting means to shunt said resistor when said detecting means is actuated in response to said zero voltage.

5. An induction heating equipment as claimed in claim 1, in which said fourth means comprises switching means serially connected to said inverter unit, timing means connected in parallel to said inverter unit for producing pulses across said inverter unit in synchronism with the zero voltage developed across said inverter unit, said pulses each having a width narrower than the duration of one cycle of said inverter unit's oscillation in normal condition, and said timing means also producing an output in response to an unusual oscillation frequency in said inverter unit for de-energizing said induction heating equipment by means of cutting off said switching means, whereby said gate-controlled rectifier in said inverter unit is protected from being destroyed by failure in reversing a current.

6. An induction heating equipment as claimed in claim 5, in which said switching means comprises a first gate-controlled rectifier having its anode and gate terminals connected across said inverter unit and a second gate-controlled rectifier having its anode and cathode terminals connected respectively to the gate and cathode terminals of said first gate-controlled rectifier and its gate terminal to the output of said timing means.

7. An induction heating equipment as claimed in claim 5, in which said fourth means further comprises overcurrent detecting means connected between the cathode and gate terminals of said second gate-controlled rectifier for cutting off said switching means in response to an overcurrent produced in said inverter unit.

* * * * *